US010308858B2

(12) United States Patent
Assmann et al.

(10) Patent No.: US 10,308,858 B2
(45) Date of Patent: Jun. 4, 2019

(54) BIODEGRADABLE ANTI-ACCRETION ADDITIVE FOR WATER-BASED DRILLING FLUIDS

(71) Applicant: BASF SE, Ludwigshafen (DE)

(72) Inventors: Andrea Assmann, Unterreit (DE); Roland Reichenbach-Klinke, Traunstein (DE); Jutta Karin Langlotz, Trostberg (DE)

(73) Assignee: BASF SE, Ludwigshafen (DE)

( * ) Notice: Subject to any disclaimer, the term of this patent is extended or adjusted under 35 U.S.C. 154(b) by 414 days.

(21) Appl. No.: 14/406,701

(22) PCT Filed: Jun. 5, 2013

(86) PCT No.: PCT/EP2013/061530
§ 371 (c)(1),
(2) Date: Dec. 9, 2014

(87) PCT Pub. No.: WO2014/005778
PCT Pub. Date: Jan. 9, 2014

(65) Prior Publication Data
US 2015/0159073 A1 Jun. 11, 2015

(30) Foreign Application Priority Data
Jul. 6, 2012 (EP) .................................. 12175319

(51) Int. Cl.
C09K 8/08 (2006.01)
E21B 7/00 (2006.01)
C09K 8/528 (2006.01)

(52) U.S. Cl.
CPC ............... C09K 8/08 (2013.01); C09K 8/528 (2013.01); E21B 7/00 (2013.01); C09K 2208/12 (2013.01)

(58) Field of Classification Search
CPC ...... C09K 8/08; C09K 8/528; C09K 2208/12; E21B 7/00; Y10S 507/905
USPC ....................................................... 507/103
See application file for complete search history.

(56) References Cited

U.S. PATENT DOCUMENTS

| 3,936,408 | A | 2/1976 | Adams et al. |
| 4,015,991 | A | 4/1977 | Persinski et al. |
| 4,053,323 | A | 10/1977 | Adams et al. |
| 4,278,749 | A | 7/1981 | Wright |
| 4,587,283 | A | 5/1986 | Hille et al. |
| 4,654,085 | A | 3/1987 | Schinski |
| 5,134,118 | A | 7/1992 | Patel et al. |
| 5,149,690 | A | 9/1992 | Patel et al. |
| 5,339,903 | A | 8/1994 | Eoff et al. |
| 5,372,642 | A | 12/1994 | Bartz et al. |
| 5,510,436 | A | 4/1996 | Hille et al. |
| 5,639,715 | A | 6/1997 | Patel |
| 5,711,383 | A * | 1/1998 | Terry ...................... C04B 28/02 106/705 |
| 6,019,835 | A | 2/2000 | Chatterji et al. |
| 6,073,709 | A * | 6/2000 | Hensley .................. E21B 21/06 166/267 |
| 6,454,004 | B2 | 9/2002 | Reddy et al. |
| 6,484,821 | B1 | 11/2002 | Patel et al. |
| 6,630,021 | B2 | 10/2003 | Reddy et al. |
| 6,793,730 | B2 | 9/2004 | Reddy et al. |
| 6,803,346 | B1 | 10/2004 | Bailey |
| 6,824,606 | B1 | 11/2004 | Berenguer et al. |
| 7,150,319 | B2 | 12/2006 | Heier et al. |
| 7,202,319 | B2 | 4/2007 | Spindler et al. |
| 8,124,670 | B2 | 2/2012 | Matzinger et al. |
| 8,376,045 | B2 | 2/2013 | Sarap et al. |
| 8,453,735 | B2 | 6/2013 | Nzeadibe et al. |
| 2002/0005287 | A1 | 1/2002 | Raghava et al. |
| 2003/0006038 | A1 | 1/2003 | Reddy et al. |
| 2005/0043187 | A1 | 2/2005 | Bailey et al. |
| 2009/0239771 | A1 | 9/2009 | Federici et al. |
| 2010/0160488 | A1 * | 6/2010 | Assmann ............... C08F 283/00 523/130 |
| 2010/0240802 | A1 | 9/2010 | Matzinger et al. |
| 2011/0166048 | A1 | 7/2011 | Merli et al. |
| 2011/0308800 | A1 | 12/2011 | Sarap et al. |
| 2012/0018226 | A1 | 1/2012 | Nzeadibe |

FOREIGN PATENT DOCUMENTS

| DE | 195 43 304 A1 | 5/1997 |
| DE | 102 29 837 A1 | 4/2003 |
| DE | 103 14 354 A1 | 6/2004 |
| EP | 0 015 880 A2 | 9/1980 |
| EP | 0 095 730 A2 | 12/1983 |
| EP | 0 116 671 A1 | 8/1984 |
| EP | 0 427 107 A2 | 5/1991 |
| EP | 0 483 638 A1 | 5/1992 |
| EP | 0 634 468 A1 | 1/1995 |
| EP | 0 653 547 A1 | 5/1995 |
| EP | 0 673 984 A1 | 9/1995 |
| EP | 1 090 889 A1 | 4/2001 |
| EP | 2 052 003 B1 | 3/2010 |

(Continued)

OTHER PUBLICATIONS

Notice of Allowance (EPO Form 2004C) with Annex to EPO Form 2004, Communication pursuant to Rule 71(3) EPC and Text Intended for Grant) dated Apr. 3, 2018 in connection with EP Patent Application No. 13 726 557.5, filed Jun. 5, 2013.

Primary Examiner — Aiqun Li
(74) Attorney, Agent, or Firm — Oblon, McClelland, Maier & Neustadt, L.L.P.

(57) ABSTRACT

The use of gelatin-based copolymers containing at least one grafted side chain formed from ethylenically unsaturated compounds as an anti-accretion additive is proposed for water-based drilling fluids in the development, exploitation and completion of underground mineral oil and natural gas deposits and in deep wells. These copolymers are water-soluble and have good biodegradability.

26 Claims, No Drawings

(56) References Cited

FOREIGN PATENT DOCUMENTS

| WO | 03/033860 A2 | 4/2003 |
| WO | 03/085013 A2 | 10/2003 |
| WO | 2008/031806 A1 | 3/2008 |
| WO | 2013/013889 A1 | 1/2013 |

* cited by examiner

BIODEGRADABLE ANTI-ACCRETION ADDITIVE FOR WATER-BASED DRILLING FLUIDS

This application is a § 371 of Intentional Application No. PCT/EP2013/061530 filed Jun. 5, 2013, and claims priority from European Patent Application No. 12175319.8 filed Jul. 6, 2012.

The present invention relates to the use of gelatin-based copolymers containing at least one grafted side chain formed from ethylenically unsaturated compounds as an anti-accretion additive for water-based drilling fluids in the development, exploitation and completion of underground mineral oil and natural gas deposits and in deep wells.

Shale is a fine, impermeable sedimentary rock consisting of clay and other minerals. It is one of the most common rocks which has to be drilled through in oilfields in order to access the oil stratum. Due to the high proportion of ionically charged clay therein, shale has a great tendency to swell with water. This makes it a very problematic rock in deep wells with water-based drilling fluids. A "shale inhibitor" has the function of preventing the shale from swelling with water.

Our PCT/EP2012/061408 of 15 Jun. 2012 with priority of 28 Jul. 2011 describes the use of hyperbranched polylysine as a shale inhibitor in water-based drilling fluids. In EP 0634468 A1, quaternized trihydroxyalkylamines are used as shale inhibitors. U.S. Pat. No. 6,484,821 B1 describes amine-modified polyalkylene oxides for the same purpose. WO 2008/031806 A1 describes uncharged or salt-type condensation products formed from $C_{4-10}$ dicarboxylic acids with alkanolamines, diamines or polyalkyleneamines as shale inhibitors. Finally, U.S. Pat. No. 5,149,690 describes polyamides and polyamino acids as shale inhibitors.

The accretion of clay on drill head and drill string is a problem which occurs particularly when water-based fluids are used for drilling through clay rocks. Clay-containing drilled material can agglomerate and accumulate on the drill string and the cutting faces of the drill head. Gradually, a large clay accretion forms, which prevents the circulation of the drilling fluid and the drilling from progressing.

There exists here a "danger zone" with regard to the clay consistency characterized by the water content. In the "dry zone", the clay-containing drilled material contains too little water to coagulate. It is of crumbly, brittle consistency. In the "wet zone", the material is essentially suspended and is easily washed away. Between these zones, i.e. in the "danger zone", the clay is a formable composition with greatly elevated tack.

When the drilled material is exposed to conventional water-based drilling fluids, it rapidly absorbs water and passes rapidly through the different "zones", and it is ultimately fully dispersed. The action of highly inhibiting drilling fluids which reduce the complete hydration of the clay-containing drilled material (with the aid of the above-mentioned shale inhibitors), however, extends this "danger zone". As a result, these drilling fluids contribute to elevated accretion.

Aside from the functionality of drilling fluid additives, however, environmental compatibility is becoming ever more important. Chemicals for offshore applications must meet strict environmental regulations. They must not be toxic, must be biodegradable, and must not be bioaccumulable. In this regard, see also http://www.cefas.defra.gov.uk, especially http://www.cefas.defra.gov.uk/industry-information/offshore-chemical-notification-scheme.aspx, http://www.cefas.defra.gov.uk/industry-information/offshore-chemical-notification-scheme/ocns-ecotoxicology-testing.aspx and http://www.cefas.defragov.uk/industry-information/offshore-chemical-notification-scheme/hazard-assessment.aspx (retrieved on 3 Jul. 2012).

US 2011/0166048 A1 discloses esters of alkanolamines with unsaturated, polyunsaturated or saturated $C_{8-36}$ monocarboxylic acids as anti-accretion additives. U.S. Pat. No. 6,803,346 B1 proposes phosphonate esters as anti-accretion additives. Said alkanolamine esters and phosphonate esters, however, are classified as toxic or hazardous to water bodies.

Water-soluble polymers, which are prepared by polymerizing ethylenically unsaturated monomers find various uses as additives in construction chemical applications, and also in the development, exploitation and completion of underground mineral oil and natural gas deposits.

U.S. Pat. Nos. 4,053,323 and 3,936,408 disclose the use of polyamidosulphonates as plasticizers for hydraulic binders, especially in the cementing of boreholes. WO 03/085013 A1 discusses water-soluble copolymers based on olefinic sulphonic acids and the use thereof as water-retention agents for aqueous building material systems comprising mineral binders. DE 102 29 837 A1 describes polymeric water retaining agents for drilling fluids and cement slurries based on vinylic sulphonic acids. According to U.S. Pat. No. 4,654,085 polyacrylamide is used together with cellulose ethers and starch ethers as an additive for improving the sag resistance of cement formulations. In addition, water influx in the production of oil or gas is reduced using water-soluble copolymers based on acrylamidoalkylenesulphonic acid, N-vinylamides, acrylamide and vinylphosphonic acid (cf. WO 03/033860 A2). EP 0427107 A2 discloses the use of a water-soluble copolymer consisting of ethylenically unsaturated sulphonic acids and acrylamides as rheological additive for drilling fluids. A further field of use for water-soluble polymers which are prepared with the aid of polymerization of ethylenically unsaturated monomers is the de-oiling of mineral oil-containing sand or rock masses, as discussed in EP 095730 A2. The use of copolymers based on hydrolyzed acrylamide and sulphonic acid derivatives as water-retention agents in cement slurries is disclosed in U.S. Pat. No. 4,015,991.

Water retention agents serve to reduce or completely prevent the escape of water from slurries of inorganic or organic binders or pigments. The cause of the water loss is usually capillary forces which originate from porous substrates. Water retention agents can either bind water by virtue of their chemical structure or promote the formation of a dense filtercake on the substrate. Water retention agents are used for this purpose as just described, for example in plasters, tile adhesives, joint mortars, spackling compounds and self-levelling compounds, but also in deep well cement slurries. In addition, their other uses include that in aqueous clay suspensions which can serve, for example, as drilling fluids. The prior art discloses a number of compounds with such properties. For instance, EP-A 1 090 889 describes mixtures of clay and guar as water retention agents. DE-A 195 43 304 and U.S. Pat. No. 5,372,642 disclose cellulose derivatives as water retention agents, EP-A 116 671, EP-A 483 638 and EP-A 653 547 describe synthetic polymers, which contain acrylamide-substituted sulphonic acids as a comonomer.

None of these water-soluble polymers which are known from the prior art and which are prepared by polymerization of ethylenically unsaturated monomers are generally biodegradable. Thus, these compounds can accumulate in the environment and contribute to contamination of soil or water bodies. This is of particular relevance when cement slurries come into contact, for example, with drinking water or agriculturally useful areas. In this context, particular attention should also be given to the use of water-soluble polymers in the exploration and production of mineral oil or natural gas at sea, i.e. in the offshore sector. These polymers find use here, for example, as water-retention agents for cementitious systems in the construction of drilling platforms and in borehole cementing. The polymers used can in the former case be washed out by sea water and in the latter case, pass from the cement slurries into water-bearing formation strata. Therefore, according to the "Convention for the Protection of the Marine Environment of the North-East Atlantic" (OSPAR Convention) biodegradable products are preferably for use in the marine environment.

The prior art already mentions a few biodegradable, polymeric additives for cement slurries. For instance, U.S. Pat. No. 6,019,835 discloses modified lignosulphonates as biodegradable dispersants. The previously-published US application 2002/0005287 describes polyaspartic acid as a biodegradable high-performance dispersant. Water-soluble, biodegradable polyamide-based copolymers and the use thereof are known from German published specification DE 103 14 354 A1. The copolymers described therein have at least one grafted side chain formed from aldehydes and sulphur acids and optionally from at least one compound from the group of ketones, aromatic alcohols, urea derivatives and amino-s-triazine. Preferred polyamide compounds mentioned are natural polyamides, such as caseins, gelatins and collagens. The copolymers described here are used especially as plasticizers or water retention agents for inorganic binders and pigments. The water-retention capacity described is based predominantly on synergistic modes of action of the copolymers described, together with modified polysaccharides. These water-soluble polymers are all biodegradable, but they generally have the great disadvantage that they do not allow such great variability of the chemical composition as the polymers formed from ethylenically unsaturated monomers, and the range of application thereof, i.e. for example, with respect to temperature or pressure changes or with respect to variations in the aqueous medium with regard to salt concentration, are therefore also very limited.

Gelatin graft polymers are generally known from EP 0 015 880 A2. According to this publication, the polymers are used in receiving elements and serve more particularly as dyestuff mordants for photographic materials. The graft polymers described consist at least of three components, which are water-soluble protein-like polymers, a monomer which gives a water-insoluble polymer in the homopolymerization, and finally a monomer which contains a sulphonate group and gives a water-soluble polymer in the homopolymerization. Gelatin is referred to as a typical representative of the water-soluble, protein-like polymers, and acrylic monomers as typical representatives of the monomers which give a water-insoluble polymer.

EP 2 052 003 B1 describes the use of polyamide-based copolymers containing at least one grafted side chain formed from ethylenically unsaturated compounds as additives for compositions comprising hydraulic binders. Preference is given to use as a water retention agent. The emphasis is on the cementing of oil and gas wells in particular. Typical representatives of the polyamide component are natural polyamides such as caseins, gelatins, collagens, bone glue, blood albumins and soya proteins.

In contrast, the use of the copolymers of this present novel invention is not directed to cement slurries but to water-based drilling fluids; water retention agents and anti-accretion additives are based on different mechanisms of action and the copolymers exemplified in EP 2 052 003 B1 have been found in an experimental comparison to be unsuitable for the inventive end use.

It is an object of the present invention to essentially avoid the above-indicated disadvantages of the prior art. More particularly, a suitable biodegradable anti-accretion additive was to be provided for water-based drilling fluids. In other words, a biodegradable drilling fluid additive was to be found, which reduces or prevents the accretion of clay-containing drilled material on metal surfaces of the drilling equipment.

This object was achieved by the features of the independent claims. The dependent claims relate to preferred embodiments.

It has been found that, surprisingly, the inventive gelatin-based copolymers are of very good suitability as a drilling fluid additive which reduces or prevents the accretion of clay-containing drilled material on metal surfaces of the drilling equipment.

The subject matter of the present invention is directed to the use of gelatin-based copolymers containing at least one grafted side chain formed from ethylenically unsaturated compounds as an anti-accretion additive for water-based drilling fluids in the development, exploitation and completion of underground mineral oil and natural gas deposits and in deep wells.

"Gelatin" is a hydrolysate formed from natural collagen, the hydrolysis being conducted under acidic, alkaline or thermal conditions. A distinction is made between gelatable gelatin [9000-70-8] and non-gelatable gelatins [68410-45-7], called gelatin hydrolysates.

Gelatin is often characterized by the "bloom value" i.e. that mass in grams which is required for a die of diameter 1.27 cm to deform the surface of a 6.67% gelatin/water mixture by four millimeters without tearing it. This test takes place at 10° C. after prior ageing of the gelatin for 17 hours. In general, the bloom value is between 50 and 300. The higher the bloom value, the higher the gelling power of the gelatin.

Bloom values of 50-125 correspond to a mean molar mass of the gelatin of about 20 000-25 000 g/mol. Bloom values of 175 to 225 correspond to about 40 000 to 50 000 g/mol. Bloom values of 225 to 325 correspond to about 50 000 to 100 000 g/mol. Bone glues are unpurified gelatins with even higher bloom values. They are less suitable for the inventive use.

According to the invention, preference is given to gelatins having bloom values of 0 to 100, especially of 0 to 50.

The abovementioned gel hydrolysates do not have measurable bloom values and are therefore also often referred to as "0 bloom gelatins". It has been found that, surprisingly, these "0 bloom gelatins" are of particularly good suitability for performance of the present invention. The molar mass range of "0 bloom gelatins" covers about 500 to 15 000 g/mol.

In general, the molar mass of the gelatins preferred in accordance with the invention is, however, in the range from 500 to 25 000 g/mol and especially in the range from 1000 to 20 000 g/mol.

The molar mass of a grafted side chain is appropriately in the range from 150 to 10 000 g/mol, preferably in the range from 200 to 5000 g/mol.

As a result, the resulting total molar mass of the inventive copolymers is appropriately in the range from 750 to 50 000 g/mol, preferably in the range from 1000 to 30 000 g/mol and especially in the range from 10 000 to 20 000 g/mol.

Use according to any of Claims 1 to 5, characterized in that the copolymers comprise the gelatin component in proportions of 10 to 90% by weight, preferably of 25 to 75% by weight, and the ethylenically unsaturated component in proportions of 10 to 90% by weight, preferably of 25 to 75% by weight.

Preference is given is likewise given to the use of copolymers which contain, as the ethylenically unsaturated component, vinylic compounds selected from the group of the vinyl ethers, acrylic acid, methacrylic acid, 2-ethylacrylic acid, 2-propylacrylic acid, vinylacetic acid, crotonic acid and isocrotonic acid, maleic acid, fumaric acid, itaconic acid, citraconic acid, amides thereof, for example acrylamide, sulphonated forms thereof, for example vinylic sulphonic acids from the group of 2-acrylamido-2-methylpropanesulphonic acid (AMPS®), vinylsulphonic acid, methallylsulphonic acid, styrenesulphonic acid, the at least monovalent salts thereof, and mixtures thereof.

In specific uses, the salts mentioned may contain, as a cation, one from the group of $Na^+$, $K^+$, $Ca^{2+}$ and/or $Mg^{2+}$ and/or, if the compounds are quaternized, a carbonate, sulphate, hydroxide or chloride as an anion. Zwitterionic compounds are also conceivable.

In the context of the present invention, the use particularly of copolymers which have been prepared by a specific process has been found to be particularly advantageous. Preference is given to a graft polymerization which is performed at temperatures between −10 and 150° C. and especially between 0 and 100° C., preferably in each case in the presence of a solvent and especially in the presence of a polar solvent such as water or dimethyl sulphoxide.

Especially suitable are copolymers whose side chains can be formed from the individual units using water or other polar solvents as solvents. Polymers with high molar masses can be obtained when either anhydrous operation is effected or the water is removed by distillation during the reaction.

As well as modifying the gelatin in solution, it is also possible to effect grafting in substance. This variant, too, gives polymers of comparatively high molar mass. If the compounds to be grafted onto the gelatin are soluble in solvents with only poor water miscibility, the copolymers can be formed by interfacial condensation. For this purpose, the gelatin is first dissolved in an aqueous phase and the compounds to be grafted in an organic phase. Vigorous mixing of the two phases allows the polycondensation to take place at the interface between aqueous and organic phases.

The invention, however, also includes the formation of the graft polymers by thermal treatment, for example by combined drying of the gelatin and the compounds to be grafted. Combined drying of a solution is also possible. In this case, water is a particularly useful solvent. The drying operation is then best effected by spray drying or roller drying.

The present invention includes especially an alternative use in which copolymers which have been prepared by functionalizing the gelatin component with a double bond are used. This reaction is effected with max. 10% by weight of an anhydride compound of the maleic anhydride or (meth)acrylic anhydride type or an epoxide compound of the glycidyl methacrylate type and a subsequent polymerization of the ethylenically unsaturated compound onto the double bond obtained.

Finally, it should be pointed out that suitable copolymers for the end use claimed are especially those which are water-soluble and/or biodegradable.

In the inventive use, the copolymer is appropriately used in a dosage of 0.01 to 25% by weight, preferably 1 to 15% by weight, based on the water-based drilling fluid.

The examples which follow and the appended drawing illustrate the advantages of the present invention.

EXAMPLES

Example 1 (Comparative Example According to EP 2 052 003 B1, Example 1.1)

169 g of technical bloom 450 gelatin (Gelita Novotec® 100) were dissolved in 700 g of water while heating to 70° C. The pH was adjusted to 8.5 with NaOH. Thereafter, 1.4 g of maleic anhydride were added in portions within 60 min. In the course of this, the pH was kept at 8.5 by simultaneous metered addition of NaOH. After addition of the maleic anhydride had been completed, the mixture was stirred at 70° C. for 60 min. Subsequently, the reaction mixture was allowed to cool to 60° C. and a solution of 60 g of AMPS in aqueous NaOH was added. The pH was adjusted to 7.6 and the mixture was purged with $N_2$ for 60 min. The reaction was then started by addition of 0.2 g of $Na_2S_2O_8$ and polymerization was effected at 60° C. for a total of 90 min. During the reaction, a significant viscosity rise was observed. The polymer thus obtained has, in a 15% aqueous solution, a viscosity of 2000 cp (measured at 60° C.) and a gel point of 26° C.

Example 2 (Inventive)

169 g of technical bloom 0 gelatin (Gelita Novotec® 600) were dissolved in 700 g of water while heating to 70° C. The pH was adjusted to 8.5 with NaOH. Thereafter, 9 g of maleic anhydride were added in portions. In the course of this, the pH was kept at 8.5 by simultaneous metered addition of NaOH. After addition of the maleic anhydride had been completed, the mixture was stirred at 70° C. for 90 min. Subsequently, the reaction mixture was allowed to cool to 60° C. and a solution of 60 g of AMPS in aqueous NaOH was added. As a comonomer, 60 g of acrylic acid were added. The pH was adjusted to 7.2 and the mixture was purged with $N_2$ for 60 min. The reaction was then started by adding 2.4 g of 2,2'-azobis(2-methylpropionamidine)dihydrochloride and polymerization was effected at 60° C. for 120 min. During the reaction, a slight rise in viscosity was observed. The polymer thus obtained has, in a 30% aqueous solution, a viscosity of 200 cp at room temperature.

Example 3 (Use Example Analogous to API Recommended Practice 13)

The specimen is freed of rust and soil with detergent and/or phosphoric acid, treated with fine sandpaper, rinsed with hot water, rinsed with isopropanol and rubbed with dry cloths. It is subsequently weighed and introduced into sealable plastic vessel. As the drilling fluid, 353 g water are initially charged together with 3 g of Cebogel® NT (bentonite, Cebo Holland B.V., the Netherlands), and KCl, xanthan, anti-accretion additive, shale inhibitor (Lupasol® PS, polyethyleneimine, BASF SE) and barite according to Table 1 are weighed in and the mixture is stirred for 20 min. Subsequently, 1 ml of tributyl phosphate is added as a defoamer. Thereafter, the rheology of the drilling fluid is measured with a Fann 35 instrument at room temperature. Specifically at 600-300-200-100-6-3 rpm. Subsequently, 350 ml of the drilling fluid are introduced into the plastic vessel, 30 g of "Arne clay" (Arne Clay Quarry, UK) with a particle size of 4 mm to 5.6 mm are added, the lid is closed and the plastic vessel is shaken gently 3-4 times. Immediately thereafter, the vessel is placed into a rolling oven at room temperature and rolled for 10 min. Subsequently, the specimen is retrieved from the plastic vessel, rinsed cautiously with a gentle cold water jet, introduced together with the residue remaining thereon into a previously weighed porcelain dish and dried at 60° C. overnight.

The respective accretions are calculated and are listed in Table 1. Table 1 reports the amounts in [g], the Fann 35 rheology values in [lb/100 ft$^2$] and the residue in [%], based on the amount of "Arne clay" used. The shale inhibitor is referred to as "PEI" and the anti-accretion additive as "AAA".

TABLE 1

| AAA-# | Bentonite | KCl | Barite | PEI | Xanthan | AAA | Fann 35 values | Residue |
|---|---|---|---|---|---|---|---|---|
| None | 3 | 9 | 190 | — | 1 | — | 60-48-43-35-17-15 | 70.63 |
| None | 3 | 9 | 190 | 17.5 | 1 | — | 51-40-35-29-15-13 | 67.20 |
| Gel. *) | 3 | 9 | 190 | 17.5 | 1 | 10.5 | 53-37-31-25-12-10 | 64.43 |
| Ex. 2 | 3 | 9 | 190 | 17.5 | 1 | 10.5 | 43-28-23-16-6-4 | 43.83 |
| Ex. 2 | 3 | 9 | 190 | 17.5 | 1 | 17.5 | 58-39-31-22-7-5 | 46.63 |
| Ex. 2 | 3 | 9 | 190 | 17.5 | 1 | 24.5 | 70-47-36-25-8-6 | 39.53 |
| Ex. 1 | 3 | 9 | 190 | — | 1 | 10.5 | 67-57-53-37-19-17 | 70.55 |
| None | 3 | — | 190 | 17.5 | 2.5 | — | 87-47-65-55-31-29 | 54.70 |
| Ex. 2 | 3 | — | 190 | 17.5 | 2.5 | 5 | 75-60-55-44-25-22 | 27.40 |
| Ex. 2 | 3 | — | 190 | 17.5 | 2.5 | 10 | 85-67-52-39-25-21 | 12.80 |
| Ex. 2 | 3 | — | 190 | 17.5 | 2.5 | 15 | 92-72-66-52-22-20 | 4.30 |

*) Technical bloom 0 gelatin (Gelita Novotec ® 600)

Table 1 clearly shows the superiority of the inventive anti-accretion additive according to Example 2.

Example 4 (Biodegradability)

The anti-accretion additive according to Example 2 was tested by the method described in "OECD Guidelines for Testing of Chemicals—1992 OECD 306: Biodegradability in Seawater, Closed Bottle Method". The reference substance was sodium benzoate. The biodegradability of the anti-accretion additive according to Example 2 was 69% after 28 days and virtually 100% after 60 days. The measurements are listed in Table 2.

TABLE 2

| Days | Ex. 2 | Na benzoate |
|---|---|---|
| 0 | 0 | 0 |
| 8 | 44 | 70 |
| 14 | 53 | 77 |
| 21 | 59 | 77 |
| 28 | 69 | 80 |
| 60 | 105 | |

The invention claimed is:

1. A method for drilling a well comprising:
   drilling a well through shale in an operation selected from the group consisting of development, exploitation and completion of underground mineral oil and natural gas deposits wells and drilling a deep well; and
   controlling the acretion of clay from the shale on a drill head and drill string by adding a water-based drilling fluid as an anti-accretion additive, wherein the water-based anti-accretion additive consists of:
   water; and
   a non-gelatable gelatin comprising at least one grafted side chain formed from an ethylenically unsaturated compound;
   wherein a content of the non-gelatable gelatin comprising at least one grafted side chain formed from an ethylenically unsaturated compound is from 1 to 15% by weight, based on the water-based drilling fluid.

2. The method according to claim 1, wherein a molar mass of the non-gelatable gelatin is from 500 to 25.000 g/mol.

3. The method according to claim 1, wherein the molar mass of the non-gelatable gelatin is from 1000 to 20,000 g/mol.

4. The method according to claim 1, wherein a molar mass of the grafted side chain is from 150 to 10,000 g/mol.

5. The method according to claim 1, wherein a molar mass of the grafted side chain is from 200 to 5,000 g/mol.

6. The method according to claim 1, wherein a molar mass of the non-gelatable gelatin comprising at least one grafted side chain is from 750 to 50,000 g/mol.

7. The method according to claim 6, wherein the molar mass of the non-gelatable gelatin comprising at least one grafted side chain is from 1,000 to 30,000 g/mol.

8. The method according to claim 7, wherein the molar mass of the non-gelatable gelatin comprising at least one grafted side chain is from 10,000 to 20,000 g/mol.

9. The method according to claim 1, wherein the non-gelatable gelatin comprising at least one grafted side chain comprises the non-gelatable gelatin component in a proportion of 10 to 90% by weight and the ethylenically unsaturated component in proportions of 10 to 90% by weight.

10. The method according to claim 1, wherein the non-gelatable gelatin comprising at least one grafted side chain comprises the non-gelatable gelatin component in a proportion of 25 to 75% by weight and the ethylenically unsaturated component in proportions of 25 to 75% by weight.

11. The method according to claim 1, wherein the ethylenically unsaturated component comprises a vinylic compound or a salt thereof.

12. The method according to claim 11, wherein the vinylic compound is at least one member selected from the group consisting of a vinyl ether, acrylic acid, methacrylic acid, 2-ethylacrylic acid, 2-propylacrylic acid, vinylacetic acid, crotonic acid, isocrotonic acid, maleic acid, fumaric acid, itaconic acid, citraconic acid and a sulfonated vinyl compound.

13. The method according to claim 12, wherein the vinylic compound is a sulfonated vinyl compound which is a vinylic sulphonic acid.

14. The method according to claim 13, wherein the vinylic sulphonic acid is at least one member selected from the group consisting of from the group of 2-acrylamido-2-methylpropanesulphonic acid, vinylsulphonic acid, methallylsulphonic acid and styrenesulphonic acid, and monovalent salts thereof.

15. The method according to claim 11, wherein the ethylenically unsaturated component is salt of a vinylic compound which contains a cation selected from the group consisting of $Na^+$, $K^+$, $Ca^{2+}$ and $Mg^{2+}$.

16. The method according to claim 11, wherein the vinylic compound comprises a quaternized cation group.

17. The method according to claim 16, wherein the quaternized cation group is a salt and further comprises an anion selected from the group consisting of a carbonate, a sulfate, an hydroxide and a chloride.

18. A method according to claim 1, wherein the non-gelatable gelatin comprising at least one grafted side chain is obtained direct graft polymerization at a temperature between 10 and 150° C.

19. The method according to claim 1, wherein the non-gelatable gelatin comprising at least one grafted side chain is obtained direct graft polymerization at a temperature between 0 and 100° C.

20. The method according to claim 18, wherein the direct graft polymerization comprises a solvent.

21. The method according to claim 20, wherein the solvent is a polar solvent.

22. The method according to claim 21, wherein the polar solvent is selected from the group consisting of water and dimethyl sulfoxide.

23. The method according to claim 1, wherein the non-gelatable gelatin comprising at least one grafted side chain is obtained by a process comprising functionalizing the non-gelatable gelatin component with a double bond.

24. The method according to claim 23, wherein the functionalizing of the non-gelatable gelatin component with a double bond comprises reaction with a maximum of 10% by weight of a maleic anhydride compound or a (meth)acryl anhydride or of a glycidyl methacrylate, and a subsequent polymerization of the ethylenically unsaturated compound onto the double bond obtained.

25. The method according to claim 1, wherein the non-gelatable gelatin comprising at least one grafted side chain is water-soluble.

26. The method according to claim 1, wherein the non-gelatable gelatin comprising at least one grafted side chain is biodegradable.

* * * * *

UNITED STATES PATENT AND TRADEMARK OFFICE
CERTIFICATE OF CORRECTION

PATENT NO. : 10,308,858 B2
APPLICATION NO. : 14/406701
DATED : June 4, 2019
INVENTOR(S) : Andrea Assmann et al.

It is certified that error appears in the above-identified patent and that said Letters Patent is hereby corrected as shown below:

In the Specification

In Column 1, Line 5, delete "Intentional" and insert -- International --, therefor.

In the Claims

In Column 7, Line 64, Claim 1, delete "acretion" and insert -- accretion --, therefor.

In Column 8, Line 10, Claim 2, delete "25.000" and insert -- 25,000 --, therefor.

Signed and Sealed this
Fourteenth Day of April, 2020

Andrei Iancu
*Director of the United States Patent and Trademark Office*